(12) United States Patent
Murray et al.

(10) Patent No.: US 11,105,673 B2
(45) Date of Patent: Aug. 31, 2021

(54) METHODS FOR CONTROLLING WEIGHT DISTRIBUTION

(71) Applicant: Ford Global Technologies, LLC, Dearborn, MI (US)

(72) Inventors: James Nicholas Murray, Chelmsford (GB); Ben Moffatt, Iver Heath (GB); Richard Craven, Chelmsford (GB); Will Barker, Berkhamsted (GB)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 16/817,063

(22) Filed: Mar. 12, 2020

(65) Prior Publication Data

US 2020/0292375 A1    Sep. 17, 2020

(30) Foreign Application Priority Data

Mar. 13, 2019 (GB) .................................... 1903445

(51) Int. Cl.
*G01G 19/08* (2006.01)
*G01G 23/37* (2006.01)

(52) U.S. Cl.
CPC ......... *G01G 19/08* (2013.01); *G01G 23/3728* (2013.01)

(58) Field of Classification Search
CPC ............... G01G 19/08; G01G 23/3728; G06Q 10/0833; G06Q 10/087; G06Q 50/30
See application file for complete search history.

(56) References Cited

U.S. PATENT DOCUMENTS

| 2016/0047646 | A1* | 2/2016 | Ochsendorf | G01C 21/343 348/148 |
|---|---|---|---|---|
| 2017/0107056 | A1* | 4/2017 | Kadaba | B65G 1/137 |
| 2018/0068266 | A1* | 3/2018 | Kirmani | G01G 19/005 |
| 2018/0290844 | A1* | 10/2018 | Lewis | B60P 1/022 |

* cited by examiner

*Primary Examiner* — Sisay Yacob
(74) *Attorney, Agent, or Firm* — Brandon Hicks; Eversheds Sutherland (US) LLP

(57) ABSTRACT

A method for a vehicle is provided. The method comprises: determining a weight and position of an item of cargo being transported by the vehicle; transmitting information comprising the weight and position to a cargo management system remote from the vehicle; receiving a weight distribution instruction from the cargo management system; and communicating the weight distribution instruction to an occupant of the vehicle.

9 Claims, 2 Drawing Sheets

METHODS FOR CONTROLLING WEIGHT DISTRIBUTION

CROSS-REFERENCE TO RELATED APPLICATIONS

The present disclosure claims priority to and the benefit of GB application No. 1903445.3, filed Mar. 13, 2019, which is hereby incorporated by reference herein in its entirety.

FIELD

The present disclosure relates to methods of controlling weight distribution of a vehicle.

BACKGROUND

It is a challenge for fleet managers of vehicles to manage the capacity of the vehicles within the fleets, both in terms of the volume of loads and the mass of the loads that are to be transported within the vehicles.

Another factor to be considered is the weight distribution of the vehicle. An item of cargo may be loaded in a number of positions within the vehicle cargo compartment and different loading positions may affect the weight distribution of the vehicle in different ways, which may in turn affect handling of the vehicle and may lead to uneven wear of vehicle components, such as suspension components.

Determining the weight distribution of a vehicle when loading multiple items of cargo on a vehicle can be time consuming for a driver of the vehicle. Furthermore, it can be challenging to determine whether loading an additional item of cargo in a particular place within the vehicle may lead to an undesirable weight distribution of the vehicle.

SUMMARY

According to an aspect of the present disclosure, there is provided a method, e.g. a computer implemented method, for a vehicle, the method comprising:

determining a weight and position of an item of cargo being transported by the vehicle;

transmitting information comprising the weight and position to a cargo management system remote from the vehicle;

receiving a weight distribution instruction from the cargo management system;

and communicating the weight distribution instruction to an occupant of the vehicle.

The method may be performed by a controller of the vehicle.

The weight distribution instruction may comprise an indication of whether a weight distribution of the vehicle is within a desirable range. Additionally or alternatively, the weight distribution instruction may comprises a cargo position instruction indicating where the item of cargo and/or a further item of cargo to be loaded onto the vehicle should be positioned.

The method may further comprise determining a size and/or shape of an item of cargo being transported by the vehicle. The transmitted information may further comprise information indicating the size and/or shape of the item of cargo.

The method may further comprise determining a free volume of the vehicle available to receive cargo. The transmitted information may further comprise information indicating the free volume of the vehicle.

The method may further comprise determining a weight distribution, e.g. a lateral and/or a longitudinal weight distribution, of the vehicle and/or of the cargo within the vehicle. The weight distribution information may be determine based on the position and weight of the item of cargo. The transmitted information may comprise the weight distribution information.

The method may comprise capturing an image of the item of cargo. The position of the item of cargo may be at least partially determined by processing the image. Additionally or alternatively, the size, shape and/or volume of the item of cargo may be determined by processing the image. Additionally or alternatively again, the free volume of the vehicle may be determined by processing the image.

The vehicle may comprise one or more pressure sensors. The weight and/or position of the item of cargo may be determined, e.g. at least partially determined, based on pressure measurements from the pressure sensors.

The vehicle may comprises one or more suspension sensors configured to determine one or more respective depressions of one or more suspension units of the vehicle. The weight and/or position of the item of cargo may be determined based on the one or more depressions. Additionally or alternatively, the weight distribution of the vehicle or the item of cargo may be determined based on the one or more depressions.

The weight distribution instruction may be communicated to the occupant when the vehicle is within a threshold distance or threshold driving time from reaching a pick-up location of the further item of cargo.

The weight distribution instruction may be displayed on a display screen of the vehicle. Additionally or alternatively, the weight distribution information may be communicated to the occupant audibly via one or more speakers provided on the vehicle. The weight distribution may be communicated to the occupant as an instruction to load a particular item of cargo in a particular location.

The method may comprise determining whether the vehicle is overloaded. The method may further comprises controlling the operation of the vehicle to prevent the vehicle from being operated or to restrict the vehicle to operating under restricted driving conditions, such as a speed limit, if the vehicle is overloaded.

The information transmitted to the cargo management system may comprise an indication of whether the vehicle is overloaded. The method may comprise generating an assistance instruction comprising an instruction for a further vehicle to load an item of cargo from the vehicle onto the further vehicle. The method may further comprise transmitting the assistance instruction to the further vehicle, e.g. if it is determined that the vehicle is overloaded.

According to another aspect of the present disclosure, there is provided a method, e.g. a computer implemented method, of controlling weight distribution of a vehicle, the method comprising:

transmitting weight and position information relating to items of cargo being transported by the vehicle to a cargo management system remote from the vehicle;

receiving a cargo position instruction from the cargo management system, the cargo position instruction indicating where an item of cargo to be loaded onto the vehicle should be positioned.

According to another aspect of the present disclosure, there is provided a method, e.g. a computer implemented method, for a vehicle, the method comprising:

determining a weight distribution of the vehicle;

transmitting information comprising the weight distribution to a cargo management system remote from the vehicle;

receiving a weight distribution instruction from the cargo management system; and communicating the weight distribution instruction to an occupant of the vehicle.

According to another aspect of the present disclosure, there is provided a method, e.g. a computer implemented method, for a cargo management system, the method comprising:

receiving, from a vehicle, information relating to weight and position of an item of cargo being transported by a vehicle;

determining whether a weight distribution of the vehicle is within a desirable range; and transmitting a weight distribution instruction to the vehicle, e.g. indicating whether the weight distribution is within the desirable range.

The method may be performed by a controller of the cargo managements system.

The method may further comprise determining a weight distribution of the vehicle based on the received weight and position information. Alternatively, the information received from the vehicle may comprise weight distribution information relating to the vehicle.

The method may further comprise communicating the weight distribution of the vehicle to a user of the cargo management system, e.g. remote from the vehicle. The weight distribution may be communicated to the user of the cargo management system using a display screen associated with the cargo management system. Determining whether a weight distribution of the vehicle is within a desirable range may comprise receiving a desirable weight distribution input from a user of the cargo management system. For example, the input may comprise a desirable weight distribution or may comprise an input indicating whether the weight distribution of the vehicle is within the desired range.

The weight distribution instruction may comprise a cargo position instruction indicating where to position the item of cargo within the vehicle. The method may comprise determining a position of the item of cargo within the vehicle, such that the weight distribution of the vehicle is within the desirable range.

The method may further comprise determining a position for a further item of cargo to be loaded within the vehicle, such that the weight distribution of the vehicle is within the desirable range. The weight distribution instruction may comprise a further cargo position instruction indicating where to position the further item of cargo within the vehicle such that the weight distribution of the vehicle is within the desirable range.

The method may further comprise receiving weight information relating to a further item of cargo to be loaded onto the vehicle. For example, the weight information relating to the further item of cargo may be received from a third party, e.g. requesting that the item of cargo be transported. Alternatively, the weight information may be input by the user.

The information received from the vehicle may further comprise information relating to, e.g. defining, the free volume, e.g. a size and/or shape of the free volume, within the vehicle within which items of cargo can be positioned. The position of the further item of cargo may be determined at least partially based on the free volume. For example, the position of the further item of cargo may be determined such that the further item of cargo is able to fit into the available space at the determined position. Additionally or alternatively, the position of the item of cargo may be determined at least partially based on the free volume. For example, the position may be determined such that the item of cargo is able to fit into the available space at the determined position. Additionally or alternatively, the position may be determined in order to create a space for the further item of cargo to be positioned at a desired location.

The method may comprise receiving, from the vehicle, information indicating whether the vehicle is overloaded. The method may further comprise generating an assistance instruction comprising an instruction for a further vehicle to load an item of cargo from the vehicle onto the further vehicle. The method may further comprise transmitting the assistance instruction to the further vehicle, e.g. if the vehicle is overloaded.

According to another aspect of the present disclosure, there is provided a method, e.g. a computer implemented method, of controlling weight distribution of a vehicle, the method comprising:

transmitting, e.g. by a transmitter of the vehicle, from the vehicle to a cargo management system remote from the vehicle, weight and position information relating to items of cargo being transported by the vehicle;

determining, e.g. by a controller of the vehicle or the cargo management system, a weight distribution of the vehicle;

determining, e.g. by a controller of the cargo management system, a desirable position of the item of cargo and/or a further item of cargo to be loaded onto the vehicle, such that a weight distribution of the vehicle is within a desirable range;

receiving a cargo position instruction at the vehicle from the cargo management system, the cargo position instruction indicating the desirable position.

A vehicle, e.g. a motor vehicle, may comprise a body defining a volume of the vehicle able to receive items of cargo to be transported by the vehicle; and a controller configured to perform any of the above-mentioned methods for a vehicle.

A cargo transport system may comprise the above-mention vehicle and a cargo management system configured to perform the above-mentioned method for a cargo management system, e.g. using a controller of the cargo management system.

To avoid unnecessary duplication of effort and repetition of text in the specification, certain features are described in relation to only one or several aspects or embodiments of the disclosure. However, it is to be understood that, where it is technically possible, features described in relation to any aspect or embodiment of the disclosure may also be used with any other aspect or embodiment of the disclosure.

BRIEF DESCRIPTION OF THE DRAWINGS

For a better understanding of the present disclosure, and to show more clearly how it may be carried into effect, reference will now be made, by way of example, to the accompanying drawings, in which.

DETAILED DESCRIPTION

Figure 1:
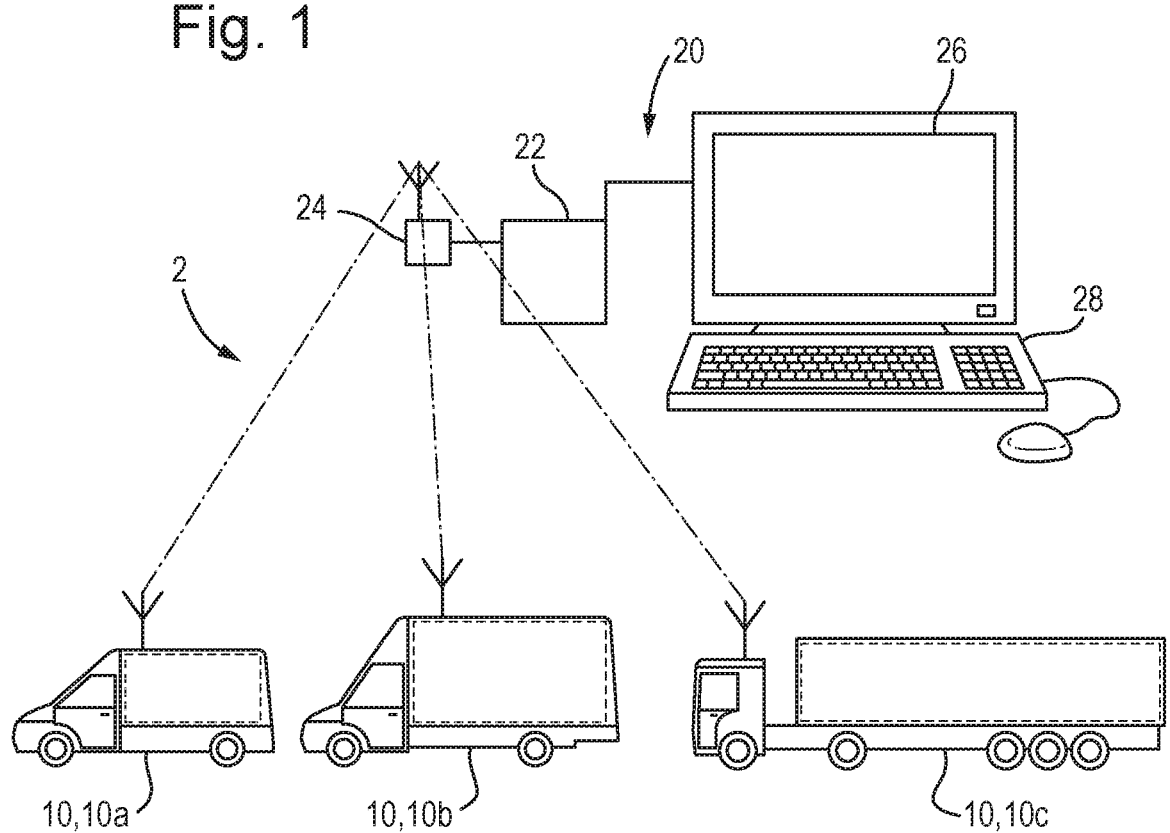
FIG. 1 is a schematic view of a cargo management system.

With reference to FIG. 1, a cargo transport system 2 comprises one or more vehicles 10, and a cargo management system 20. The cargo management system 20 can be operated by a fleet manager to manage the cargo being transported within vehicles 10 forming part of the cargo transport system 2.

In particular, the cargo management system 20 may enable the fleet manager to manage the quantity, weight and/or volume of items of cargo being loaded onto each of the vehicles 10. Furthermore, the cargo management system 20 may enable the fleet manager to control the weight distribution of each of the vehicles 10 or of the cargo within the vehicles.

The vehicles 10 may be operated to transport cargo within an area served by the cargo transport system 2. The cargo management system 20 may be located remotely from the vehicles 10. For example, the cargo management system 20 may be located at a central location, such as a server room or fleet management office. Alternatively, the cargo management system 20 may be located in one of the vehicles 10.

In the arrangement shown in FIG. 1, three vehicles 10 are provided within the cargo transport system 2. However in other arrangements, any other number of vehicles 10 may be provided within the cargo transport system 2. For example, one, two or more than three vehicles 10 may be provided within the system 2. Furthermore, the number of vehicles 10 within the system may vary during operation of the system 2. For example, one or more of the vehicles 10 may leave the cargo transport system 2, e.g. when a driver of the vehicle ends their shift or moves to another cargo transport system 2, such that the fleet manager is no longer managing the cargo being transported by the vehicle using the cargo management system 20. Additionally or alternatively, one or more additional vehicles may join the cargo transport system 2 so that the fleet manager is able to begin managing the cargo they are transporting.

Figure 2:
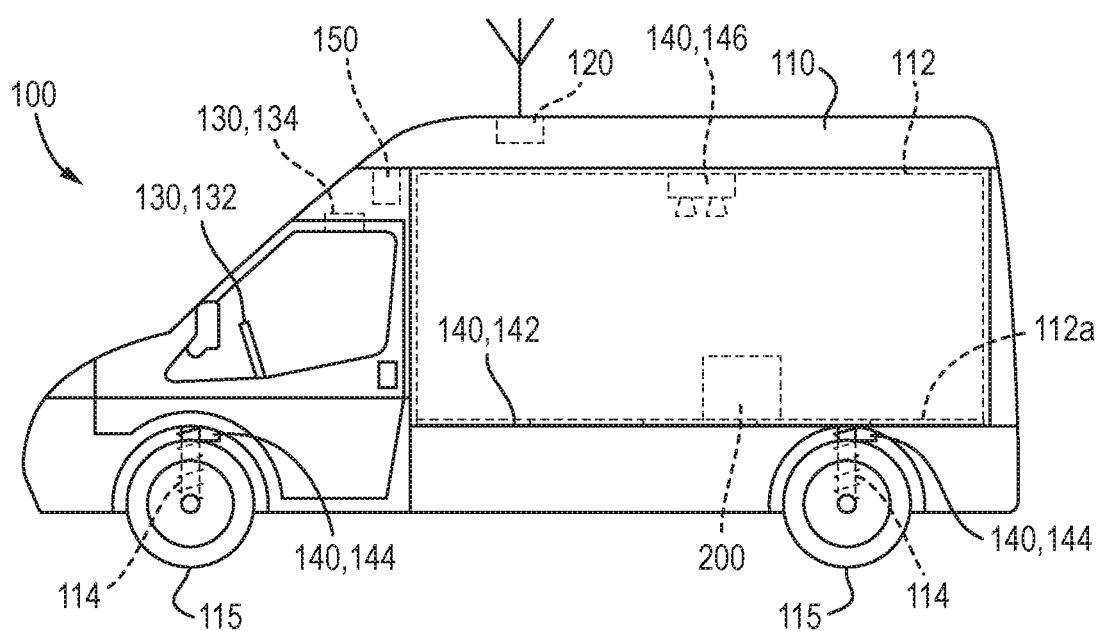
FIG. 2 is a schematic side sectional view of a vehicle for use within the cargo management system depicted in FIG. 1.

With reference to FIG. 2, a vehicle 100 for use within the cargo transport system 2 comprises a body structure 110, which defines a cargo compartment 112 for storing items of cargo 200 being transported by the vehicle 100. In FIG. 2, a single item of cargo is shown within the cargo compartment 112. However, it will be appreciated that any number of items of cargo may be loaded into the cargo compartment 112 depending on the volume of the cargo compartment and the sizes of the items.

The vehicle 100 further comprises a transmitter/receiver 120 for communicating with the cargo management system 20.

The vehicle 100 depicted in FIG. 2 comprises a light commercial vehicle. However, as shown in FIG. 1, each of the vehicles 10 within the cargo transport system 2 may be a different model or class of vehicle. For example, a first vehicle 10a may be a light or medium commercial vehicle, a second vehicle 10b may be a light goods vehicle and a third vehicle 10c may be a heavy goods vehicle. Accordingly, each of the vehicles 10 has a cargo compartment of a different size for storing cargo. Characteristics of the vehicles 10 within the cargo transport system 2, such as the model, class and storage capacity of the vehicles 10 may be stored within a memory of the cargo management system 20.

Returning to FIG. 2, the vehicle 100 comprises one or more sensors 140 for determining the weight and position of items of cargo loaded into the vehicle 100. In the arrangement shown in FIG. 1, the vehicle comprises one or more weight or pressure sensors 142 installed in, or on a surface of, a floor 112a of the cargo compartment 112.

The vehicle 100 may further comprise one or more suspension depression sensors 144. The suspension depression sensors 144 may be configured to measure the amount that suspension units 114 of the vehicle are depressed, e.g. due to the weight of items of cargo being loaded onto the vehicle. Each of the suspension depression sensors 144 may be associated with a different suspension unit 114 of the vehicle, e.g. associated with a different wheel 115 of the vehicle.

The vehicle 100 may further comprise an image capture sensor 146, such as a camera or 3D camera, configured to capture images of the cargo compartment 112, e.g. of items of cargo 200 within the cargo compartment 112.

The vehicle 100 may further comprises one or more occupant interface devices 130, such as a display screen 132 and/or a speaker 134 for communicating instructions to the occupants of the vehicle 100, e.g. which have been received at the vehicle from the cargo management system 20.

The vehicle 100 further comprises a vehicle controller 150 comprising one or more modules configured to operate the sensors, 140, the transmitter/receiver 120 and the occupant interface devices 130.

Figure 3:
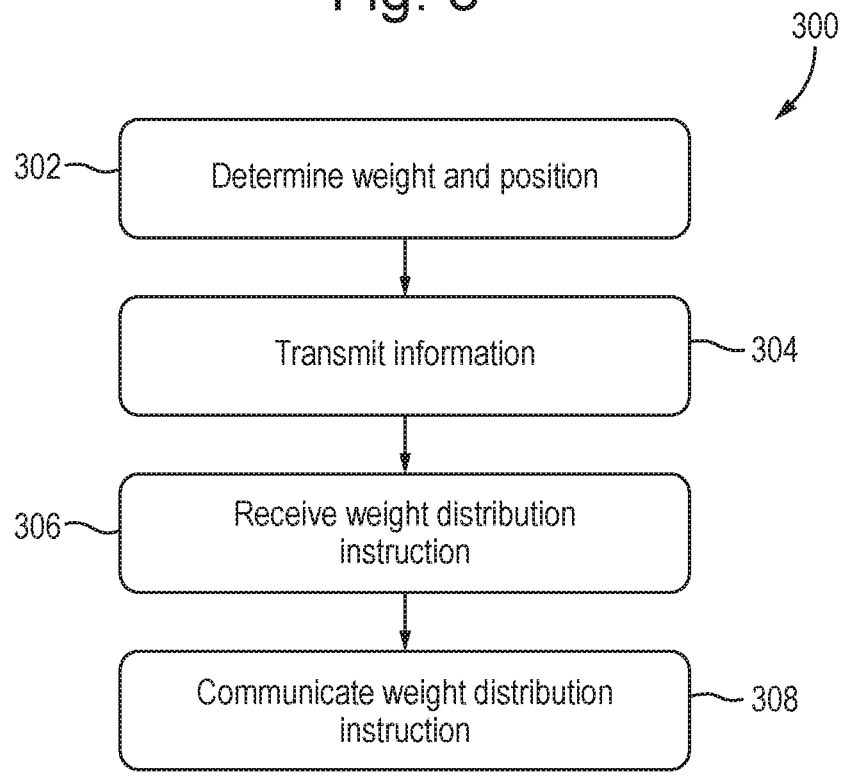
FIG. 3 is flow chart depicting a method for a vehicle.

With reference to FIG. 3, the vehicle controller 150 may be configured to operate according to a method 300. Although in the description of the method 300 below the steps are described as being performed for a single item of cargo, it will be appreciated that each of the steps may be applied to any number of items of cargo. Alternatively, the method 300 may be repeated for each of the items of cargo transported by the vehicle 100.

The method 300 comprises a first step 302, in which a weight and position of an item of cargo being transported by the vehicle is determined. The controller 150 may determine the weight of the item of cargo by using weight or pressure measurements from the one or more of the pressure or weight sensors 142. Additionally or alternatively, the controller 150 may calculate the weight of the item of cargo by using depressions of the suspension units 114 of the vehicle determined from the suspension depression sensors 144. For example, the controller 150 may determine depressions of each of the suspension units 114 before and after the item of cargo is loaded and may calculate the weight of the item of cargo using the difference in depressions of the suspension units 114.

The controller 150 may be configured to determine whether the vehicle is overloaded. For example, the controller 150 may compare the weight of the items of cargo, e.g. the total weight of all of the items of cargo loaded on the vehicle, to a maximum permitted weight of cargo to be transported by the vehicle.

The controller 150 may determine the position of the item of cargo on the vehicle 100 by capturing an image of the item of cargo using the image capture sensor 146 and processing the captured image. Additionally or alternatively, the controller 150 may determine the position of the item of cargo by referring to measurements from the one or more weight or pressure sensors 142. For example, the controller 150 may determine the area of the floor 112a of the cargo compartment over which the weight of the item of cargo is applied, and may determine the position of the item of cargo based on the area.

Additionally or alternatively again, the controller 150 may determine the position of the item of cargo based on the depressions of the suspension units 114 of the vehicle measured using the suspension depression sensors 144. For example, the weight of the item of cargo may be determined, as described above, and the position of the item of cargo may be determined based on the weight of the item and the depressions of one or more of the suspension units 114.

In addition or as an alternative to determining the weight and position of the item of cargo, the controller 150 may be configured to determine the weight distribution of the vehicle 100. The weight distribution may be a lateral weight distribution or a longitudinal weight distribution of the vehicle. In some arrangements, the controller may determine a lateral weight distribution of the vehicle and a longitudinal weight distribution of the vehicles.

Lateral weight distribution may be defined as a ratio of the weight of the vehicle being supported by the left and right wheels of the vehicle. Similarly, longitudinal weight distribution may be defined as a ratio of the weight of the vehicle being supported by the front and rear wheels of the vehicle.

The controller 150 may determine the weight distribution of the vehicle based on the weight and position of each of the items of cargo loaded onto the vehicle. Additionally or alternatively, the controller 150 may determine the weight distribution of the vehicle based on the relative depressions of the suspension units 114. For example, the controller 150 may determine the weight of the vehicle being supported by the front wheels and the rear wheels, or the left and right wheels, based on the depressions of the corresponding suspension units 114.

The controller 150 may be configured to determine a shape and/or size, e.g. length, width and/or depth, of the item of cargo. The shape and/or size of the item of cargo may be determined by capturing an image of the item of cargo, e.g. using the image capture sensor 146, and processing the image to determine the size of the item of cargo. In some arrangements, the controller 150 may be configured to determine the shape, e.g. three-dimensional shape, of the item of cargo.

The controller 150 may be further configured to determine a free volume of the cargo compartment 112, e.g. in which items of cargo are not positioned. The free volume of the cargo compartment 112 may be determined by capturing an image of the cargo compartment, e.g. using the image capture sensor 146, and processing the image to determine the volume of the cargo compartment 112 that is free from items of cargo.

The method 300 may comprise a second step 304, in which information comprising the weight and position of the item of cargo is transmitted, e.g. by the transmitter/receiver 120, to the cargo management system 20. Additionally, the information may comprise the size, e.g. length, width, depth, and/or shape of the item of cargo. If the controller 150 has determined that the vehicle is overloaded, the information transmitted to the cargo management system 20 may include an indication that the vehicle is overloaded.

In addition or as an alternative to transmitting the weight and position of the item of cargo, the second step 304 may comprise transmitting information comprising the weight distribution of the vehicle 100 to the cargo management system 20.

The method 300 may further comprise transmitting the free volume of the cargo compartment 112 to the cargo management system. The free volume of the cargo compartment 112 may be transmitted during the second step 304, e.g. together within the weight and position, and/or weight distribution information. Alternatively, the free volume of the cargo compartment may be transmitted separately, e.g. in another step of the method 300.

The method 300 may comprise a third step 306, in which a weight distribution instruction is received from the cargo management system 20. The weight distribution information may be generated by the cargo management controller 22 as described below.

The weight distribution instruction may comprise information indicating that the current weight distribution of the vehicle is within a desired range. Alternatively, the weight distribution instruction may comprise information indicating that the weight distribution of the vehicle is outside of the desired range.

The weight distribution instruction may comprise a cargo position instruction. The cargo position instruction may indicate where the item of cargo should be positioned. In particular, the cargo position instruction may comprise a desired position to move the item of cargo 200 into, e.g. in order to adjust the weight distribution of the vehicle into the desired range. Additionally or alternatively, the cargo position instruction may comprise a further desired position in which a further item of cargo should be loaded on the vehicle, e.g. such that the weight distribution of the vehicle is within the desired range. For example, the weight distribution instruction may include an instruction to move the item of cargo to the desired position within the vehicle and/or an instruction to load the further item of cargo into the further desired position on the vehicle, so that the weight distribution of the vehicle is within the desired range after the further item of cargo has been loaded.

If the information transmitted to the cargo management system 20 included an indication that the vehicle is overloaded or if the cargo management system 20 determines that the vehicle is overloaded, as described below, the weight distribution instruction may comprise an instruction that an item of cargo should be removed from the vehicle, the instruction may indicate that the vehicle should not be operated, or should be operated under restricted driving conditions, e.g. below a predetermined speed limit, until the item of cargo has been removed.

In some arrangements, the controller 150 may be configured to control the operation of the vehicle to prevent the vehicle from being operated or to restrict the vehicle to operating under the restricted driving conditions when the weight distribution instruction to remove an item of cargo from the vehicle is received. Additionally or alternatively, the controller 150 may be configured to control the operation of the vehicle to prevent the vehicle from being operated or to restrict the vehicle to operating under the restricted driving conditions when it is determined that the vehicle is overloaded. For example, the controller 150 may be configured to activate a kill switch installed on the vehicle to prevent the vehicle from being operated or to restrict the vehicle to operating under the restricted driving conditions, when it is determined that the vehicle is overloaded or when the weight distribution instruction is received.

The method 300 may comprise a fourth step 308, in which the weight distribution instruction is communicated to an occupant, such as a driver, of the vehicle. The weight distribution instruction may be communicated to the driver using the display screen 132. For example, the controller 150 may control the operation of the display screen 132 to display an indication of whether the weight distribution is within the desired range. Additionally or alternatively, the controller 150 may control the operation of the display screen 132 to display an indication of the position in the vehicle that the item of cargo should be moved to and/or the position in the vehicle at which the further item of cargo should be loaded, such that the weight distribution of the vehicle is within the desired range.

Additionally or alternatively, the controller 150 may communicate the weight distribution instruction to the occupant audibly, e.g. using the speaker 134. For example, the controller 150 may generate audio comprising a verbal instruction indicating the position in the vehicle to which the item of cargo should be moved and/or the position in the vehicle at which the further item of cargo should be loaded, such that the weight distribution of the vehicle is within the desired range. Alternatively, the weight distribution instruction received from the cargo management system may comprise audible instructions to be communicated using the speaker 134.

Returning to FIG. 1, the cargo management system 20 may comprise a cargo management controller 22 and a transmitter/receiver 24 associated with the cargo management controller 22. The transmitter/receiver 24 is configured to communicate with the vehicles 10 within the cargo transport system 2.

The cargo management system 20 further comprises one or more user interface devices, such as a display screen 26 and one or more user input devices 28, such as a keyboard and mouse, associated with the cargo management controller 22.

Figure 4:
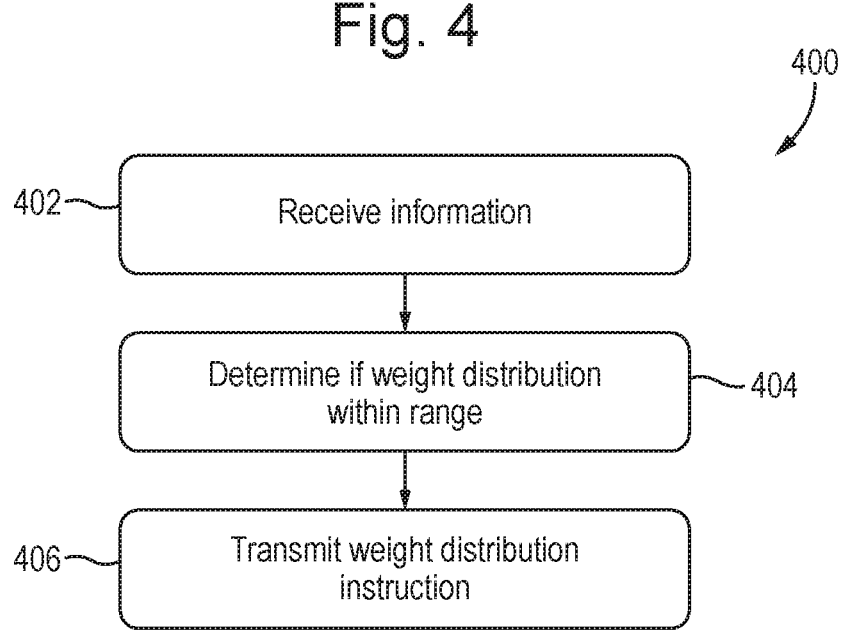
FIG. 4 is a flow chart depicting a method for a cargo management system.

With reference to FIG. 4, the cargo management controller 22 of the cargo management system 20 may be operated according to a method 400. The cargo management controller 22 may perform the method 400 at substantially the same time that the vehicle controller 150 is performing the method 300.

The method 400 comprises a first step 402, in which information comprising the weight and position of an item of cargo being transported by a vehicle is received, e.g. from the vehicle 10 within the cargo transport system 2. Additionally, the information received from the vehicle may comprise size and/or shape information relating to the item of cargo.

Additionally or alternatively, the information received from the vehicle may comprise an indication that the vehicle is overloaded. Alternatively, the controller 22 may be configured to determine whether the vehicle is overloaded. For example, the controller 22 may compare the weight of the items of cargo, e.g. the total weight of all of the items of cargo loaded on the vehicle, to the maximum permitted weight of cargo to be transported by the vehicle.

As described above, the vehicle controller 150 may be configured to transmit information comprising that weight distribution of the vehicle 100 in addition, or as an alternative, to transmitting information comprising the weight and position of the item of cargo. Accordingly, the first step 402 may comprise receiving the weight distribution information in addition or as an alternative to receiving the weight and position information.

The controller 22 may be configured to determine the weight distribution, e.g. the lateral and/or longitudinal weight distribution, of the vehicle based on the weight and position information received from the vehicle, e.g. if the weight distribution information is not received from the vehicle.

The method 400 further comprises a second step 404, in which it is determine whether the weight distribution, e.g. the lateral or longitudinal weight distribution, of the vehicle is within a desired range. In some arrangements, the cargo management controller 22 may determine whether the lateral weight distribution is within a first desired range and whether the longitudinal weight distribution is within a second desired range, e.g. in the second step 404.

The desired ranges of weight distribution, e.g. the first and second desired ranges, may be predetermined ranges stored within a memory associated with the controller 22. As mentioned above, the vehicles 10 within the cargo transport system 2 may be different models and/or classes of vehicles and the controller may compare the weight distribution of each particular vehicle to a desired range that is relevant to the model or class of the particular vehicle.

Alternatively, the desired ranges of weight distribution may be input by a user of the cargo management control, e.g. using the input devices 28. The desired range of weight distribution may by input by the user prior to the cargo being loaded onto the vehicle. Alternatively, the user may input the desirable range whilst the method is being performed. Alternatively again, the controller 22 may be configured to present the weight distribution to the user of the cargo management system 20, e.g. using the display screen 26, and a user may provide an input indicating whether the weight distribution is within a desired range, e.g. without the desired range being input to the controller 22.

If the information received from the vehicle comprised an indication that the vehicle is overloaded or the controller 22 determines that the vehicle is overloaded, the second step 404 may not be performed. In other words, the controller 22 may not determine a weight distribution of the vehicle, if the vehicle is overloaded.

The controller 22 may generate a weight distribution instruction to be transmitted to the vehicle based on the weight distribution and/or whether the weight distribution is within the desired range or ranges. Alternatively, the weight distribution instruction to be transmitted to the vehicle may be input by the user of the cargo management system, e.g. using the input device 28.

The weight distribution instruction may comprise an indication of whether the weight distribution, e.g. the lateral and/or longitudinal weight distribution, is within the desired range or ranges.

Additionally or alternatively, the weight distribution instruction may comprise a cargo position instruction. The cargo position instruction may comprise an instruction to move the item of cargo to a desired position within the vehicle, e.g. within the cargo compartment 112. The cargo position instruction may comprise a definition of the position for the item of cargo to be moved to. Additionally or alternatively again, the cargo position instruction may comprise an instruction to load a further item of cargo onto the vehicle in a further desired position. The further item of cargo may be an item scheduled to be loaded onto the vehicle.

As described above, if the information received from the vehicle comprised an indication that the vehicle is overloaded or the controller 22 determined that the vehicle is overloaded, the weight distribution instruction may comprise an instruction that an item of cargo should be removed from the vehicle, the instruction may indicate that the vehicle should not be operated, or should be operated under the restricted driving conditions until the item of cargo has been removed.

The method 400 comprises a third step 406, in which the weight distribution instruction is transmitted to the vehicle, e.g. using the transmitter/receiver 24.

When the weight distribution instruction comprises a cargo position instruction comprising an instruction to load a further item of cargo onto the vehicle in a further desired position, the cargo position instruction may be transmitted to the vehicle when the further item has been scheduled to be loaded onto the vehicle. Alternatively, the cargo position instruction may be transmitted to the vehicle when the vehicle is within a predetermine distance of a pick-up location, at which the further item of cargo is to be loaded onto the vehicle, or when a predicted travel time of the vehicle to reach the pick-up location is within a predetermine time. Alternatively again, the cargo position instruction may be transmitted to the vehicle and the vehicle controller 150 may be configured to communicate the cargo position instruction to the occupants of the vehicle when the vehicle is within a predetermine distance of a pick-up location, at which the further item of cargo is to be loaded onto the vehicle, or when a predicted travel time of the vehicle to reach the pick-up location is within a predetermine time. For example, the cargo position instruction may specify when the cargo position instruction should be communicated to the occupants.

The controller 22 may be configured to receive information relating to the size and/or weight of further items of cargo to be transported by the vehicle within the cargo transport system 2, e.g. from third parties who are arranging transport of the items of cargo. The controller 22, may determine a desired position of the further item of cargo within the vehicle such that the weight distribution of the vehicle will be within the desirable range. Alternatively, the controller 22 may receive an input from the user of the cargo management system, e.g. via the input device 28, providing the desired position.

When the information received from the vehicle comprises information defining the free volume of the vehicle available for receiving items of cargo, the controller 22 may generate the desired position of the item of cargo and/or the further desired position of the further item cargo at least partially based on the free volume of the vehicle and the size and/or shape of the item of the item of cargo and/or the further item of cargo, e.g. such that the item of cargo and/or the further item of cargo will fit into the vehicle at the desired position.

If the desired position and/or the further desired position, and/or the weight distribution instruction is input by the user of the cargo management system 20, the controller 22 may confirm whether it is possible for the item of cargo and/or the further item of cargo to fit into the desired position based on the free volume of the vehicle and the size and/or shape of the item of cargo and/or the further item of cargo before transmitting the weight distribution instruction to the vehicle.

The controller 22 may generate the weight distribution instruction based on the desired position and/or the further desired position, e.g. determined by the controller or input by the user.

If the information received from the vehicle comprised an indication that the vehicle is overloaded or the controller 22 determined that the vehicle is overloaded, the controller 22 may generate an assistance instruction to be sent to a further vehicle, e.g. operating in the cargo transport system 2, that is less heavily loaded than the vehicle. The assistance instruction may comprise an instruction to the further vehicle to load an item of cargo from the vehicle onto the further vehicle, such that the vehicle is no longer overloaded. The instruction may comprise a location of the vehicle and/or a location at which the further vehicle is to load the item of cargo. The assistance instruction may comprise a cargo position instruction indicating a position where the item of cargo should be loaded on the further vehicle, e.g. based on the weight distribution of the further vehicle.

In other arrangements, the assistance instruction may be generated by the controller 150 of the overloaded vehicle and may be transmitted to the cargo management system 20, e.g. in addition to or instead of the indication that the vehicle is overloaded. The cargo management system 20, e.g. the controller 22, may determine which vehicle within the cargo transport system 2 the assistance instruction should be transmitted to. Alternatively, the assistance instruction may be transmitted directly from the overloaded vehicle to the further vehicle.

The controller 22 may perform the method 400 in respect of each of the vehicles 10 within the cargo transport system 2. In some arrangements, the controller 22 may perform the method 400 in respect of more than one of the vehicles 10 substantially simultaneously.

In such arrangements, the controller 22 may be configured to display the weight, position, weight distribution, and/or free volume information relating to one, more than one or each of the vehicle 10 within the cargo transport system 2, e.g. using the display screen 26, such that the user of the cargo management system 20 can monitor the information.

Additionally, the controller 22 may be configured to receive inputs from the user, e.g. via the user input devices 28, during operation of the cargo management system, e.g. at any point. The controller 22 may generate the weight distribution instruction and transmit the weight distribution instruction to the controller 22 in response to receiving the input from the user, e.g. by performing the third step 406 of the method 400.

The following additional, numbered statements of disclosure are also included within the specification and form part of the present disclosure:

Statement 1. A method for a vehicle, the method comprising:
 determining a weight and position of an item of cargo being transported by the vehicle;
 transmitting information comprising the weight and position to a cargo management system remote from the vehicle;
 receiving a weight distribution instruction from the cargo management system; and
 communicating the weight distribution instruction to an occupant of the vehicle.

Statement 2. The method of statement 1, wherein the weight distribution instruction comprises a cargo position instruction indicating where the item of cargo and/or a further item of cargo to be loaded onto the vehicle should be positioned.

Statement 3. The method of statement 1 or 2, wherein the method further comprises:
 determining a size of an item of cargo being transported by the vehicle, wherein the transmitted information further comprises information indicating the size of the item of cargo.

Statement 4. The method of any of the preceding statements, wherein the method further comprises:
 determining a free volume of the vehicle available to receive cargo, wherein the transmitted information further comprises information indicating the free volume of the vehicle.

Statement 5. The method of any of the preceding statements, wherein the method further comprises:
 determining a weight distribution of the vehicle, wherein the transmitted information comprises the weight distribution of the vehicle.

Statement 6. The method of any of the preceding statements, wherein the method further comprises:
 capturing an image of the item of cargo; and
 processing the image to determine the position of the item of cargo.

Statement 7. The method of any of the preceding statements, wherein the vehicle comprises one or more pressure sensors, wherein the weight and/or position of the item of cargo is determined based on one or more pressure measurements from the one or more pressure sensors.

Statement 8. The method of any of the preceding statements, wherein the vehicle comprises one or more suspension sensors configured to determine one or more respective depressions of one or more suspension units of the vehicle, wherein the weight and/or position of the item of cargo is determined based on the one or more depressions.

Statement 10. The method of any of the preceding statements, wherein the weight distribution instruction is communicated to the occupant when the vehicle is within a threshold distance or threshold driving time from reaching a pick-up location of the further item of cargo.

Statement 11. The method of any of the preceding statements, wherein the method further comprises:
 determining whether the vehicle is overloaded; and
 controlling the operation of the vehicle to prevent the vehicle from being operated or to restrict the vehicle to operating under restricted driving conditions if the vehicle is overloaded.

Statement 12. A method for a cargo management system, the method comprising:
 receiving, from a vehicle, information relating to weight and position of an item of cargo being transported by a vehicle;
 determining whether a weight distribution of the vehicle is within a desirable range; and
 transmitting a weight distribution instruction to the vehicle.

Statement 13. The method of statement 12, wherein the method further comprises:
 determining a weight distribution of the vehicle based on the received weight and position information.

Statement 14. The method of statement 12 or 13, wherein the method further comprises:
 presenting the weight distribution of the vehicle to a user of the cargo management system.

Statement 15. The method of any of statements 12 to 14, wherein determining whether a weight distribution of the vehicle is within a desirable range comprises receiving a desirable weight distribution input from a user of the cargo management system.

Statement 16. The method of any of statements 12 to 15, wherein the method further comprises:
 determining a desired position of the item of cargo within the vehicle, such that the weight distribution of the vehicle is within the desirable range, wherein the weight distribution instruction comprises a cargo position instruction indicating where to position the further item of cargo within the vehicle.

Statement 17. The method of any of statements 12 to 16, wherein the method further comprises:
 determining a further desired position for a further item of cargo to be loaded within the vehicle, such that the weight distribution of the vehicle is within the desirable range, wherein the weight distribution instruction comprises a further cargo position instruction indicating where to position the further item of cargo within the vehicle.

Statement 18. The method of statement 17, wherein the method further comprises:
 receiving weight information relating to a further item of cargo to be loaded onto the vehicle.

Statement 19. The method of statement 17 or 18, wherein the information received from the vehicle further comprises information relating to the free volume within the vehicle within which items of cargo can be positioned, wherein the position of the further item of cargo is determined at least partially based on the free volume.

Statement 20. The method of any of statements 16 to 19, wherein the information received from the vehicle further comprises information relating to the free volume within the vehicle within which items of cargo can be positioned, wherein the position of the item of cargo is determined at least partially based on the free volume.

Statement 21. The method of any of statements 11 to 20, wherein the method further comprises:
 receiving, from the vehicle, information indicating whether the vehicle is overloaded; and
 generating an assistance instruction comprising an instruction for a further vehicle to load an item of cargo from the vehicle onto the further vehicle.

Statement 22. A vehicle comprising:
 a body structure defining a volume of the vehicle able to receive items of cargo to be transported by the vehicle; and
 a controller configured to perform the method of any of statement 1 to 9.

Statement 23. A cargo management system, the system comprising:
 a vehicle of statement 22; and
 a cargo management controller configured to perform the method of any of statements 11 to 20.

It will be appreciated by those skilled in the art that although the disclosure has been described by way of example, with reference to one or more exemplary examples, it is not limited to the disclosed examples and that alternative examples could be constructed without departing from the scope of the disclosure as defined by the appended claims.

The invention claimed is:

1. A vehicle comprising:
 a body structure defining a volume of the vehicle able to receive items of cargo to be transported by the vehicle;
 one or more sensors configure to determine the weight and position of one or more items of cargo loaded into the vehicle, wherein the one or more sensors comprise an image capture sensor configured to capture images of the volume of the vehicle able to receive items of cargo; and
 a controller configured to:
  determine a weight of an item of cargo being transported by the vehicle;
  determine a position of the item of cargo being transported by the vehicle by capturing an image of the item of cargo using the image capture sensor and processing the captured image;
  transmit information comprising the weight and position to a cargo management system remote from the vehicle;
  receive a weight distribution instruction from the cargo management system; and
  communicate the weight distribution instruction to an occupant of the vehicle.

2. The vehicle of claim 1, wherein the weight distribution instruction comprises a cargo position instruction indicating where the item of cargo and/or a further item of cargo to be loaded onto the vehicle should be positioned.

3. The vehicle of claim 1, wherein the controller is further configured to:
 determine a size of an item of cargo being transported by the vehicle, wherein the transmitted information further comprises information indicating the size of the item of cargo.

4. The vehicle of claim 1, wherein the controller is further configured to:
- determine a free volume of the vehicle available to receive cargo, wherein the transmitted information further comprises information indicating the free volume of the vehicle.

5. The vehicle of claim 1, wherein the controller is further configured to:
- determine a weight distribution of the vehicle, wherein the transmitted information comprises the weight distribution of the vehicle.

6. The vehicle of claim 1, wherein the vehicle comprises one or more pressure sensors, wherein the weight and/or position of the item of cargo is determined based on one or more pressure measurements from the one or more pressure sensors.

7. The vehicle of claim 1, wherein the vehicle comprises one or more suspension sensors configured to determine one or more respective depressions of one or more suspension units of the vehicle, wherein the weight and/or position of the item of cargo is determined based on the one or more depressions.

8. The vehicle of claim 1, wherein the weight distribution instruction is communicated to the occupant when the vehicle is within a threshold distance or threshold driving time from reaching a pick-up location of the further item of cargo.

9. The vehicle of claim 1, wherein the controller is further configured to:
- determine whether the vehicle is overloaded; and
- control the operation of the vehicle to prevent the vehicle from being operated or to restrict the vehicle to operating under restricted driving conditions if the vehicle is overloaded.

* * * * *